Patented Dec. 18, 1951

2,578,736

UNITED STATES PATENT OFFICE 2,578,736

NEW INSECTICIDES

Michel Pijoan, United States Navy, and Robert D. Englert, Henry J. Gerjovich, and Mortimer L. Hopwood, Boulder, Colo.

No Drawing. Application May 29, 1946, Serial No. 673,035

14 Claims. (Cl. 167—32)

(Granted under the act of March 3, 1883, as amended April 30, 1928; 370 O. G. 757)

This invention relates to new insecticides, particularly certain hydrogenated naphthalene derivatives obtained by condensation with chloral.

In recent years the problem of developing insecticides, particularly those effective against crop-destroying or disease-bearing insects has become of critical importance. Heretofore, insecticides have comprised chemicals whose action was determined either by their poisonous nature to all animals or by their effect on specific groups of animals. In general, these insecticides have been either respiratory, digestive or contact poisons. Among these have been gases such as hydrocyanic acid, respiratory poisons such as pyrethrums and rotenone, or digestive poisons like fluorides. In recent years a more specific agent against insects has been discovered which presents the added value that it remains effective, with varying temperature conditions over a considerable period of time. Thus, in small doses, as low as 5% dichloro-diphenyl, trichloroethane (DDT) is effective against flies for periods of weeks. However, it is now appreciated that DDT does not exert insecticidal action against ants or cockroaches in the low doses ordinarily employed and that these insects only succumb after a sufficiently high dosage has been obtained.

This invention is specifically directed to the development of improved insecticides which are characterized by a rapid lethal action against certain insects, functioning as a contact poison in relatively low concentrations, and which are of marked persistence and duration regarding stability and are furthermore less injurious to mammals than the insecticides heretofore utilized.

Considered broadly, these compounds comprehend that group comprised of naphthols and naphthalenes condensed with chlorals in which, in certain instances, specific functioning groups are substituted in the nucleus. As will be seen more fully hereinafter these functioning groups may comprehend a relatively wide range of substituent radicals such as halogens, alkoxy groups, hydroxy groups, acetyl-amino groups and the like. While there is a difference in the insecticidal effect of the several compounds of this group it has been found that they all possess the characteristics which establish them as effective insecticides, namely, marked chemical stability and relatively high toxicity against invertebrates in concentration sufficiently low to be relatively innocuous to vertebrate life.

The rationale of the invention will be more readily comprehended from a consideration of the synthesis, structure and insecticidal action of specific compounds of the general type discussed above.

An effective compound of this group is 5,5'-bis(1,2,3,4 tetrahydronaphthyl) trichloro methyl methane, designated for convenience hereinafter as TTN. This product may be prepared by reacting 1 mol of tetralin (tetrahydronaphthalene) with 0.5 mol of anhydrous chloral in 250 ml. of chloroform. The mixture is agitated and cooled and maintained at a temperature of 15° C. While constant agitation is maintained a total of 100 gms. of 110% $H_2SO_4$ is added, preferably dropwise, to the reaction mixture. With the amounts mentioned above the total quantity of acid is added in a period of approximately one hour. Agitation is continued for an additional two hour period after the total quantity of acid has been introduced. The reaction product is then poured from the vessel into a chilling medium, as for example, on about 250 gms. of cracked ice. It is particularly to be observed, as a precaution, that the reaction mixture should be poured slowly and with vigorous stirring into the chilling mixture. Thereafter the chloroform is distilled off by boiling the product for a period of approximately twelve hours. The residual solution is then allowed to cool and settle. After cooling the supernatant liquid is removed by decantation or by some other suitable method, the residue is washed with water, then dried and recrystallized from petroleum ether. The resultant compound can be represented structurally as:

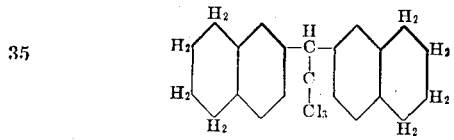

This compound was found to be soluble in inexpensive readily available solvents such as paraffin hydrocarbons, notably kerosene and gasoline, and other mineral and certain vegetable oils. This range of solubility, it will be appreciated, is of particular importance because the efficacy of the contact insecticides is largely determined by its solubility in liquids which readily penetrate the chitinous, waxy and oleaginous surfaces of the insects. While general solubility of this type of compound, therefore, is of paramount importance for its contact insecticidal action, a salient physical characteristic of this compound is its solubility in solutions which, for the sake of a term, will be called chitin introfiers.

For purposes of evaluative insecticidal testing this product was dissolved in peanut oil. Peanut oil was chosen for test purposes since in itself it is non-toxic to insects where as mineral oils are generally toxic in various degrees to insects. Two solutions, 5% and 10% were prepared and 0.03 ml. of the solution was applied carefully to the dorsal thoracic surface of a large number of common house flies and cockroaches. For purposes of comparison and evaluation an equivalent number of insects were similarly contacted with solutions of 5% and 10% DDT in the same vehicle, namely, peanut oil. As is known to investigators studying insecticides, peanut oil is the standard vehicle for test-comparison purposes of insecticides, particularly DDT. The results of the comparative tests are indicated below.

The killing time recorded in the following table was based on the death time of the last fly in which the total killing action did not exceed 15% between the death of the first insect and the last one. In each case record 50 flies were treated with each indicated preparation. Variation in results is circumvented to a great degree by the use of flies of the same age group, namely, insects 72 hours old. As has been the common experience the age of the insect limits the insecticidal action of a contact insecticide. For instance, when using flies 120 hours following emergence from pupal life the average killing time of 5% DDT in peanut oil is extended to 618 minutes and 5% TTN in peanut oil to 798 minutes. For all studies of the compounds to be described 3 day old adult flies were used throughout.

*Table*

| | Killing time, minutes |
|---|---|
| 5% DDT in peanut oil | 168 |
| 5% TTN in peanut oil | 240 |
| 10% DDT in peanut oil | 200 |
| 10% TTN in peanut oil | 100 |

From the inspection of the foregoing table it will be observed that whereas 5% of DDT in peanut oil is more effective than the equivalent amount of TTN in the same vehicle a marked difference in results is obtained when the relative concentrations are increased. Thus, in a 10% concentration, the lethal time of TTN is considerably shorter than that of DDT.

At first inspection it would appear that DDT would be considered the more effective insecticide since it has a lower killing time in more dilute concentrations. However, it is well known that DDT is toxic to vertebrate life and that such toxicity increases with increased concentration of this compound. On the other hand TTN has been found to be substantially non-toxic in concentrations of 50% to vertebrate animals. This type of compound, therefore, fulfills the difficultly attainable pharmacological criteria of high parasite toxicity and low host toxicity, i. e. vertebrate animals.

Having thus established the intrinsic insecticidal action of TTN in relatively inert peanut oil, which as noted, is notoriously low in its chitin penetrating action being a poor solvent for insect waxes, its effect in commonly used commercially available solvents was studied. Here again, the compound TTN was tested under the same conditions and compared to DDT. It was found as a result of these tests that a 10% solution of DDT in "Sensol" (a paraffin hydrocarbon) had a killing time of 20 minutes while 10% of TTN displayed a killing time of 2 minutes. Similarly, whereas a 10% solution of DDT in Shell Base No. 1 (a deodorized kerosene) had a killing time of 16 minutes, the same concentration of TTN in the solvent had killing time of 1 minute.

Another compound of this general type which was produced, tested and found to be highly efficacious is 7,7' bis(1,2,3,4 tetrahydro 2 methoxy naphthyl) trichloro methyl methane, which may be simply designated at TNTN. This compound may be prepared by the general method described hereinbefore, namely, by reacting 2 methoxy, 1,2,3,4 tetrohydronaphthalene with chloral. A 5% solution of this compound in peanut oil exhibited a killing time of 398 minutes on 72 hour old adult flies and a 10% solution had a killing time of 300 minutes.

As in the case of TTN, solutions of TNTN in penetrant solvents like "Sensol" and Shell Base No. 1 exhibited a more effective killing time than DDT. For example, a 10% solution of DDT in "Sensol," as noted above, displayed a killing time of 20 minutes whereas the same concentration of TNTN in this solvent exhibited a killing time of 13 minutes. Again, whereas 10% DDT in Shell Base No. 1 killed in 16 minutes the same concentration of TNTN in this particular solvent killed in 10 minutes.

Comparable results were obtained utilizing as an insecticide 3,3' bis (1-methoxy naphthyl) trichloro methyl methane. This compound was produced by reacting methoxy naphtalene with chloral in the manner previously described. A 5% solution of this product in peanut oil exhibited a killing time on 72 hour old adult flies of 297 minutes. However, a 10% solution in peanut oil reduced the killing time on the same age group of insects to 207 minutes. It is to be observed that this compound (TMTN) like TTN is substantially non-toxic in relatively high concentrations to vertebrate animals.

It is to be noted that by comparison of 7,7' bis(1,2,3,4 tetrahydro 2 methoxy naphthyl) trichloro methyl methane with 3,3' bis (1-methoxy naphthyl) trichloro methyl methane that the position of the functioning group, as well as partial hydrogenation of the nucleus brings about marked modification of insecticidal action.

It has been further found that by substituting in the condensed naphthol-chloral or naphthalene-chloral nucleus, other functioning groups, particularly amino or acetyl amino radicals effective insecticides of comparable value result. As an example of this type of compound may be cited bis-(4-amino naphthyl) trichloro methyl methane and bis-(4-acetyl amino naphthyl) trichloro methyl methane.

Similarly, compounds comprised of condensed naphthol, naphthalene-chloral nucelus in which other functioning groups are introduced yield insecticides. Examples of this type were synthesized including 7,7' bis(1,2,3,4 tetrahydro 2 ethoxy naphthyl) trichloro methyl methane; 2,2' bis(1-brom naphthyl) trichloro methyl methane; bis(3,7, bromo-4,8 hydroxy naphthyl) trichloro methyl methane; 2,2' bis(1-iodo-naphthyl) trichloro methyl methane.

Other chloral condensation products of naphthalene having generally similar insecticidal action may be economically produced. Examples of this type are given below to indicate the varying degrees of insecticidal action correlated with the degree of peripheral nuclear chlorination and the presence of chloral.

1,4,1'-4', tetrachloro dinaphthyl, 2,trichloroethane. To prepare this compound 2 gms. of dinaphthyl trichloro-ethane were dissolved in 120 ml. carbon tetrachloride and subjected to chlorination with chlorine gas for 6 hours in the presence of 10 mg. of ferric chloride as catalyst. The reaction mixture was stirred during this entire time. The solution was then filtered and water added to the filtrate and heated to boiling to remove carbon tetrachloride. The compound was triturated with water and filtered. The compound was further washed with water and dried in a vacuum oven. When dry the product was dissolved in a small amount of hot acetone and when completely dissolved was poured slowly into pure methyl alcohol with vigorous stirring. A precipitate formed which was allowed to remain in the alcohol for 12 hours. The precipitate was collected, washed further with methyl alcohol and dried in a vacuum oven. The compound had a melting point of 188–190° C. The chlorine content theoretical is 47.29%, actual 47.29%. The reaction is as follows:

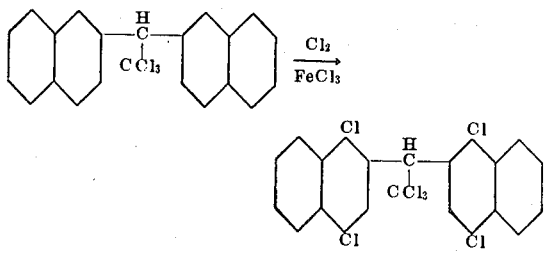

This compound was found to kill, on contact, both cockroaches and flies within a period of one hour.

Since the degree of chlorination is probably related to the insecticidal action of the compounds described, synthesis was undertaken of a naphthyl derivative with but a low content of chlorine but similar in position to the compound described above. It should be supposed that such a compound would have low insecticidal qualities. Such a compound, namely, 1,1' dichlorodinaphthyl, 2, trichloroethane may be prepared as follows: 1 mol. of alpha chloro naphthalene and 0.5 mol of chloral hydrate are stirred together and 300 gms. of concentrated sulfuric acid is added. Then in small portions, 30 gms. of 60% oleum are added with great caution since the reaction develops considerable heat. The mixture is maintained as cool as possible and, after all the oleum is added, stirring is continued for 3 hours. The mixture is then poured on cracked ice, the plastic residue is filtered and boiled in a liter of water for 30 minutes. The product is filtered and washed with alcohol, dried and recrystallized from acetone. This operation produced a 25% yield. The compound has a melting point of 190° C. The theoretical chlorine content of this product is 39.04% while that actually found was 38.03%. The reaction may be represented as follows:

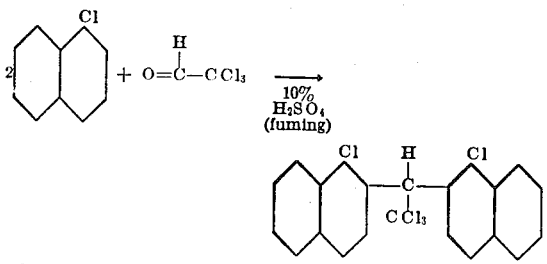

This compound was approximately one-half as effective as preparation #1, 1,4,1',4' tetrachloro dinaphthyl 2 trichloroethane killing flies and roaches in 2–3 hours.

To further substantiate the postulate that the lower degree of chlorination reduces the insecticidal action of the unhydrogenated naphthyl structure, a lower chlorinated product, namely, dinaphthyl trichloroethane was prepared as follows: 1 mol of naphthalene was dissolved in 100 gms. of chloroform and was reacted with 0.5 mol of anhydrous chloral. The reaction may be represented as follows:

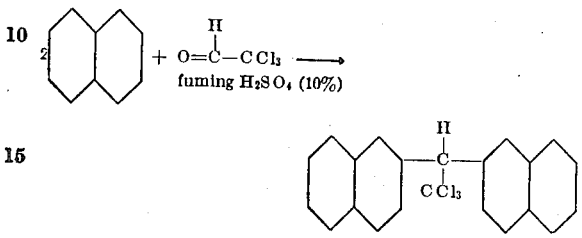

This product had no effect whatsoever on flies, mosquitoes or cockroaches. It was therefore evident that the presence of a functioning group is necessary for insecticidal action.

Since these unhydrogenated naphthyl derivatives lacking alkoxy functioning groups exerted a diminishing insecticidal action paralleling the degree of chlorine concentration it became of interest to study the correlative effect of the chloral group and the peripheral chlorine concentration. For this purpose a dinaphthyl containing no chloral but high in peripheral chlorine was produced for test purposes, namely, 4,5 tetrachloro alpha dinaphthyl, as follows: 2 gms. of alpha dinaphthyl are dissolved in 115 gms. of carbon tetrachloride. To this was added 100 mg. ferric chloride and chlorinated with chlorine gas with constant stirring for a period of four hours. The reaction mixture was then poured into 100 ml. of water and boiled to remove all of the carbon tetrachloride. The aqueous mixture was extracted with ether and the ether fraction dried with anhydrous sodium sulfate; the ether evaporated and the remaining plastic-like product was dissolved in hot absolute alcohol. When dissolved pour into 500 ml. distilled water. A white precipitate was obtained which was filtered, dried and washed with small amounts of absolute methyl alcohol. M. P. 72–73° C. Chlorine content, theoretical 36.4%, actual 38.8%.

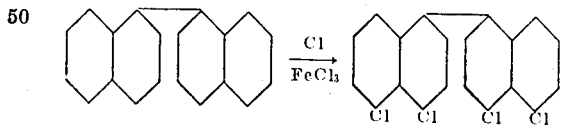

This compound failed to kill any of the insects tested which indicated the necessity of the presence of the chloral group.

It is thus evident that hydrogenation of certain compounds, specifically naphthyls and naphthols promotes the insecticidal action if trichloro methyl methane is included in the structure. Therefore, partial saturation of chloral condensation naphthalene derivatives acts as a functioning group relative to insecticidal action.

The presence of other functioning groups may be substituted for hydrogenation of dinaphthyl or dinaphthol derivatives. Thus, a methoxy group in dinaphthyl trichloro methyl methane is of the same order of insecticidal effectives as the tetra hydro substitution in the ring. Examples of other alkoxy groups given in this application appear to indicate a varying degree of insecticidal action dependent on their position and presence.

It is of interest to note that the degree of chlorination does not necessarily increase insecticidal action. Thus, 1,4,1,4' tetrachlor dinaphthyl 2 trichloro methyl methane is less effective than 5,5'-bis(1,2,3,4 tetrahydro naphthyl) trichloro methyl methane. The presence of chloral on diphenyl structures, as noted by other investigators, appears to be active also in these particular dinaphthyls and dinaphthols.

While for the purpose of establishing the efficacy of the described compounds, liquid solvents have been chosen as the carrier vehicle it will be understood that these compounds may be associated with other types of vehicles such as inert powders and the like. Furthermore, these compounds may be dissolved in oleaginous solvents and emulsified in water to produce effective emulsions. Manifestly, the ultimate compositions may include adjuvants such as wetting agents to increase their effectiveness. The compounds also may be dissolved in suitable liquefied, normally gaseous solvents and packaged in pressure containers for aerosol spraying.

While the invention has been illustrated by the disclosure of the preparation and insecticidal action of certain compounds it is to be understood that these are given merely didactically to illustrate the broad concept expressed above, namely, the production of effective insecticides comprising a naphthalene nucleus condensed with a chloral which nucleus contains substituent functioning groups.

The invention described herein may be manufactured and used by or for the Government of the United States of America for governmental purposes without the payment of any royalties thereon or therefor.

We claim:

1. An improved insecticidal composition containing as an essential active ingredient a compound comprising, dissolved in an insect penetrant solvent, two partially hydrogenated naphthol rings condensed with a chloral group, such naphthol rings having a substituted alkoxy group.

2. An improved insecticidal composition containing as an essential active ingredient, a compound, dissolved in an insect penetrant solvent, consisting of two partially hydrogenated naphthalene rings condensed with a chloral group in which rings is substituted a functioning substituent chosen from the group consisting of hydroxy, alkoxy, halogen and carboxylic acid ester groups.

3. An improved insecticidal composition containing as an active essential ingredient 5,5'-bis(1,2,3,4 tetrahydronaphthyl) trichloro methyl methane dissolved in a solvent.

4. An improved insecticidal composition containing as an active essential ingredient 5,5'bis-(1,2,3,4 tetrahydronaphthyl) trichloro methyl methane in a carrier vehicle.

5. An improved insecticidal composition containing as an active essential ingredient 5,5'bis-(1,2,3,4 tetrahydronaphthyl) trichloro methyl methane dissolved in a mineral fraction.

6. An improved insecticidal composition containing as an effective insecticidal agent 3,3'-bis(1-methoxy naphthyl) trichloro methyl methane dissolved in an insect penetrant solvent.

7. An improved insecticidal composition containing as an effective insecticidal agent 3,3'bis-(1-methoxy naphthyl) trichloro methyl methane incorporated in a carrier vehicle.

8. An improved insecticidal composition containing as an effective insecticidal agent 3,3'bis-(1-methoxy naphthyl) trichloro methyl methane incorporated in a liquid carrier vehicle.

9. An improved insecticidal composition containing as an effective insecticidal agent 3,3'bis-(1-methoxy naphthyl) trichloro methyl methane dissolved in a suitable solvent.

10. An insecticidal composition containing as an effective insecticidal agent 7,7'bis(1,2,3,4 tetrahydro 2 methoxy naphthyl) trichloro methyl methane dissolved in an insect penetrant solvent.

11. An insecticidal composition containing as an effective insecticidal agent 7,7'bis(1,2,3,4 tetrahydro 2 methoxy naphthyl) trichloro methyl methane incorporated in a carrier vehicle.

12. An insecticidal composition containing as an effective insecticidal agent 7,7'bis(1,2,3,4 tetrahydro 2 methoxy naphthyl) trichloro methyl methane incorporated in a liquid carrier vehicle.

13. An insecticidal composition containing as an effective insecticidal agent 7,7'bis(1,2,3,4 tetrahydro 2 methoxy naphthyl) trichloro methyl methane dissolved in a suitable solvent.

14. An improved insecticidal composition comprising an insect penetrant solvent in which is dissolved as an essential insect toxicant a compound chosen from the group consisting of a condensation product of chloral and hydrogenated naphthol, and a condensation product of chloral and hydrogenated naphthalene.

MICHEL PIJOAN.
ROBERT D. ENGLERT.
HENRY J. GERJOVICH.
MORTIMER L. HOPWOOD.

REFERENCES CITED

The following references are of record in the file of this patent:

UNITED STATES PATENTS

| Number | Name | Date |
|---|---|---|
| 1,302,905 | Ellis | May 6, 1919 |
| 1,722,323 | Gurtin | July 30, 1929 |
| 2,010,841 | Bender | Aug. 13, 1935 |
| 2,110,897 | Vivian et al. | Mar. 15, 1938 |
| 2,329,074 | Muller | Sept. 7, 1943 |
| 2,402,896 | Kerr | June 25, 1946 |
| 2,420,928 | Bousquet et al. | May 20, 1947 |

OTHER REFERENCES

Procedure Amer. Wood Preserves Assoc., 1924, pp. 33–37.

Elbs: Jour. für Prakt. Chem., vol. 47, 1893, pp. 68–71.

Beilstein: "Handbuch der Organischen Chem.," 4th ed., vol. 6, p. 1055.

Kharasch et al.: "Jour. of Organic Chem.," vol. 1, 1936, pp. 265–274, abstracted in 31 Chem. Abstracts 1020, 1021.